Oct. 5, 1926.

H. H. WESSEL 1,602,217

SPRING WASHER

Filed June 18, 1925

INVENTOR
Howard H. Wessel
BY
Mitchell Bechut
ATTORNEYS.

Patented Oct. 5, 1926.

1,602,217

UNITED STATES PATENT OFFICE.

HOWARD H. WESSEL, OF NEW BRITAIN, CONNECTICUT, ASSIGNOR TO THE HART & COOLEY COMPANY, INCORPORATED, OF NEW BRITAIN, CONNECTICUT, A CORPORATION OF CONNECTICUT.

SPRING WASHER.

Application filed June 18, 1925. Serial No. 38,023.

My invention relates to a friction holding plate or disk, particularly, though not exclusively, adapted for holding toy wheels or the like on a shaft.

It is the principal object of the invention to provide a friction holding means of the character indicated, which will be cheap to manufacture and yet will hold on a shaft or the like with a substantial degree of firmness.

Briefly stated, in the preferred form of the invention I employ a thin sheet metal plate or disk, which is cupped. A plurality of integral spring arms are formed on the disk, and at the tip of each spring arm is a friction holding jaw shaped to lie flat along a shaft so as to provide a substantial bearing and friction holding surface thereon.

In the drawings which show, for illustrative purposes only, a preferred form of the invention—

Figure 1:
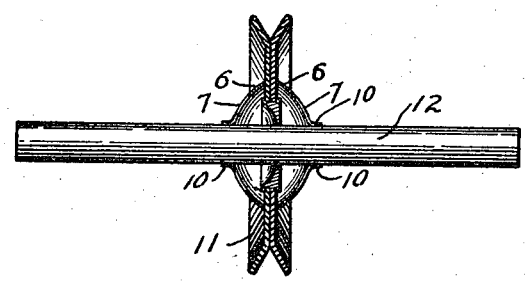
Fig. 1 is a central sectional view illustrating one application of the invention.
Figure 2:
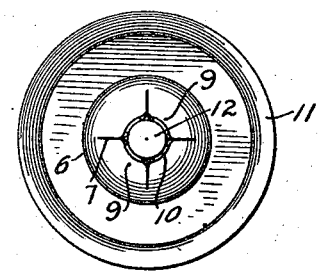
Fig. 2 is a view in end elevation of parts shown in Fig. 1.
Figure 4:
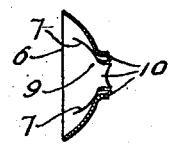
Fig. 4 is a central sectional view of a finished spring friction disk.
Figure 5:
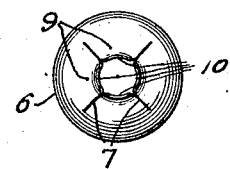
Fig. 5 is a view in elevation of the disk shown in Fig. 4.

In said drawings, 6 indicates a thin sheet metal plate, preferably in the form of a disk. The disk is cupped or dished, as indicated particularly in Figs. 1 and 4, for a purpose to be later described. The disk may be slit or slotted, at 7—7, and an aperture 8 may be formed at the center, to which aperture the slits 7 extend. The slits define what I term spring arms 9—9, and at the tip of each spring arm is formed by bending an integral friction holding jaw 10 preferably of substantial width and length so as to afford a bearing surface on the shaft. The several jaws together form, in effect, a bore in the disk, the side walls of said bore being yielding.

A disk, as described, may be employed for a variety of purposes, wherever it is desired to position a member on a shaft, or the like, friction tight.

In the single application of the invention illustrated I show the spring washers 6—6 as securing a toy pulley or wheel 11 upon a shaft 12. The pulley is first put on the shaft and the spring washers then slipped over the shaft and against the pulley or wheel. The fact that the washers are dished or cup shaped forms, in effect, a relatively long offset hub on the pulley to be accommodated between two washers. The engagement between the pulley and the washers being at a substantial distance away from the wheel axis affords a more secure holding against tilting of the pulley on the shaft. Another advantage of the dished construction is that the arms 9—9 extend at an angle to the shaft so that when the washer is slipped on the shaft from one end the fingers extending at an angle thereto flex more readily than if they were at right angles to the shaft, as would be the case were the disk not dished. The friction holding fingers preferably lie substantially flat along the shaft 12, and thus afford a good friction holding surface.

Figure 3:
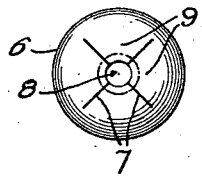
Fig. 3 is a view in elevation of a partly formed blank illustrating one stage in the manufacture of the invention.

If a definite aperture, such as 8 (see Fig. 3) is provided in the blank before the friction fingers are struck up and the slits merged into this aperture, the tips of the fingers will be substantially smooth, and are not what are ordinarily referred to as "burrs", formed by driving a pin through a metal disk. The ends of the friction fingers will also be relatively blunt and smooth, so as to be convenient to handle and operate. Should the aperture 8 not be formed in the blank and the slits 7—7 simply intersect each other, the friction fingers will then be sharp on the ends and will not be so convenient for handling.

When it is desired to remove the disks from the shaft they may be slipped endwise thereon in either direction, this being permitted by the substantial bearing surfaces of the friction finger tips on the shaft. Were there no fingers extending along the shaft, it is probable that the ends of the spring arms would dig into the shaft when it was attempted to slide the disks thereon in one direction, thus rendering adjustment difficult or impossible. It will therefore be seen that by means of my invention I am enabled to provide a friction holding plate or washer, which will be cheap to manufacture, which will hold on a shaft or the like with substantial firmness, and yet which may be slid thereon in either direction, and a disk which will have a finished appearance and be convenient and safe to handle.

While the invention has been described in some detail I do not wish to be strictly limited to the form shown, since changes may be made within the scope of the invention as defined in the appended claim.

I claim:—

As an article of manufacture, a metallic concaved plate having a central aperture, a plurality of radial slits intersecting said aperture and forming integral spring arms thereon around said aperture, and transversely curved friction holding fingers offset at the ends of said spring arms and integral therewith and defining a bearing hub upon said plate.

HOWARD H. WESSEL.